United States Patent [19]

Ma

[11] Patent Number: 5,793,804
[45] Date of Patent: Aug. 11, 1998

[54] SYSTEM AND METHOD FOR REDUCING THE PEAK LOAD ON THE PROCESSOR OF A BLOCK PROCESSING MODEM

[75] Inventor: Weiqiang Ma, Tempe, Ariz.

[73] Assignee: Intel Corporation, Santa Clara, Calif.

[21] Appl. No.: 827,537

[22] Filed: Mar. 28, 1997

Related U.S. Application Data

[63] Continuation of Ser. No. 367,572, Jan. 3, 1995, abandoned.
[51] Int. Cl.$^6$ ............................................. H04B 1/38
[52] U.S. Cl. ..................... 375/222; 375/377; 395/250
[58] Field of Search ........................... 375/222, 377, 375/372, 354, 355, 371; 395/250; 364/723

[56] References Cited

U.S. PATENT DOCUMENTS

| | | | |
|---|---|---|---|
| 3,754,098 | 8/1973 | Abramson et al. | 375/371 |
| 4,056,849 | 11/1977 | Bevis | 364/900 |
| 4,316,061 | 2/1982 | Ahamed | 370/109 |
| 4,453,259 | 6/1984 | Miller | 375/355 |
| 5,101,341 | 3/1992 | Circello | 395/375 |
| 5,121,342 | 6/1992 | Szymborski et al. | 375/225 |
| 5,274,681 | 12/1993 | Yamada et al. | 375/272 |
| 5,311,561 | 5/1994 | Akagiri | 375/240 |

Primary Examiner—Wellington Chin
Assistant Examiner—William Luther
Attorney, Agent, or Firm—Blakely, Sokoloff, Taylor & Zafman

[57] ABSTRACT

A system and method for limiting the processing load on a digital processor in a block processing modem that is receiving data that was generated remotely using a clock having a frequency that may be different than the frequency of the clock in the receiving modem. The receiving modem includes a digital processor having a desired processing capacity reserved for block processing of L samples of data per block period, an analog to digital converter for the received data into samples, an interpolator and a buffer memory. The analog to digital converter outputs L–A samples per block and passes them to the interpolator, where $A \geq 1$. The interpolator processes L–B samples per block and passes them on to the buffer, where $B \geq 0$. The buffer passes L samples per block to the modem processor. If L samples are not available, the processor skips a cycle. The inventor also contemplates a modem transmitter that includes a buffer that receives L samples per block from the digital processor and supplies a block of size L–A samples to a digital analog converter. The buffer accumulates A samples on each block transfer and when there are L–A samples in the buffer, a block of L–A samples is passed without receiving any additional samples from the digital processor.

6 Claims, 5 Drawing Sheets

| BLOCK PERIOD | TX PROCESSING | TX FIFO | TX D/A BUFFER | FIFO REMAINDER |
|---|---|---|---|---|
| 1 | 120 | 120 | 119 | 1 |
| 2 | 120 | 121 | 119 | 2 |
| 3 | 120 | 122 | 119 | 3 |
| 4 | 120 | 123 | 119 | 4 |
| ⋮ | | | | |
| 119 | 120 | 238 | 119 | 119 |
| 120 | 0 | 119 | 119 | 0 |
| 121 | 120 | 120 | 119 | 1 |

*FIG. 4*

| BLOCK PERIOD | INTERPOLATOR OUT | RX FIFO | RX PROCESSING | FIFO REMAINDER |
|---|---|---|---|---|
| 1 | 119 | 119 | 0 | 119 |
| 2 | 119 | 238 | 120 | 118 |
| 3 | 119 | 237 | 120 | 117 |
| 4 | 119 | 236 | 120 | 116 |
| 5 | 120 | 236 | 120 | 116 |
| 6 | 119 | 235 | 120 | 115 |
| 7 | 119 | 234 | 120 | 114 |
| ⋮ | | | | |
| | 119 | 120 | 120 | 0 |
| | 119 | 119 | 0(SKIP | 119 |
| | 119 | 238 | PROCESSING) 120 | 118 |

*FIG. 5*

| BLOCK PERIOD | INTERPOLATOR OUT | RX FIFO | RX PROCESSING | FIFO REMAINDER |
|---|---|---|---|---|
| 1 | 119 | 119 | 0 | 119 |
| 2 | 119 | 238 | 120 | 118 |
| 3 | 118 | 237 | 120 | 117 |
| 4 | 119 | 236 | 120 | 116 |
| 5 | 119 | 234 | 120 | 114 |
| 6 | 119 | 233 | 120 | 113 |
| ⋮ | | | | |
| | 119 | 120 | 120 | 0 |
| | 119 | 119 | 0(SKIP | 119 |
| | | 238 | PROCESSING) 120 | 118 |

*FIG. 6*

SYSTEM AND METHOD FOR REDUCING THE PEAK LOAD ON THE PROCESSOR OF A BLOCK PROCESSING MODEM

This is a continuation of application Ser. No. 08/367,572, filed Jan. 3, 1995, now abandoned.

BACKGROUND OF THE INVENTION

1. Field of the Invention

The present invention relates to the field of data communications, and more particularly to efficiently managing the transmitter and receiver buffers in a modem.

2. Description of the Related Art

Modems have long been used in the field of data communications for transmitting data from a remote location to a local location over a channel. At the remote location, digital data samples are converted to analog form at a predetermined sampling rate, such as 9600 samples/second, for transmission over the channel. These analog samples are received at the local modem, and converted back into digital form. These digital samples may then undergo processing, such as decoding, filtering or other forms of data manipulation.

Ideally, the transmitter clock at which the analog signals are sent over the channel is exactly synchronized with the receiver clock that controls the sampling rate at which the analog signals are converted back into digital form. However, this is often not the case, mostly because of non-ideality in the crystals that control the transmitter and receiver clocks. To account for these differences, an interpolator follows the analog-to-digital converter (A/D) in the local modem. The interpolator includes a timing recovery circuit that derives the transmitter clock from the digital samples of the received analog waveform. Using this information, the interpolator effectively resamples the received signal at the transmitter clock sampling rate. If the transmitter and receiver clocks are exactly synchronized, then the number of samples outputted by the interpolator in a given period of time will equal the number of samples generated by the local A/D. If, however, the transmitter clock sampling rate recovered by the symbol timing recovery circuit is slower than the local A/D sampling rate (the remote underspeed case), then the slight offset in the clocks will result in a sample being lost periodically. Finally, if the recovered transmitter clock is faster than the received clock controlling the local A/D (the remote overspeed case), then periodically the interpolator will generate an extra sample in a given period of time as compared to the number of samples generated by the A/D in that same time period.

In the remote underspeed case, the receiver that receives the samples from the interpolator occasionally will skip the processing of samples because it is not being fed samples at a fast enough rate to keep up with the receiver processing speed. On the other hand, in the case of remote overspeed, the receiver must process extra samples, thereby creating a sudden demand for processing power. The receiver processor typically is heavily taxed in performing such functions as decoding and filtering. Thus, the need to process extra samples may require that the receiver processor put off performing other functions. As an alternative, the receiver processor might be designed to have enough computing power available to handle the peak demand.

Accordingly, it is desired to provide a modem that efficiently processes information and that lessens the peak demand on the receiver processor.

SUMMARY OF THE INVENTION

The present invention provides a method and apparatus for modem buffer management for increasing modem processor efficiency. According to the present invention, the modem buffer management system includes a transmitter modem having a transmitter processor for generating successive blocks of data. Each block is composed of L samples. A transmitter buffer receives the blocks of data and outputs L–A of the L samples of each received block, where A≧1. A samples of the L samples accumulate in the transmitter buffer each time after the outputting of the L–A samples. If a total of L–A samples accumulate in the transmitter buffer, the transmitter buffer outputs the accumulated L–A samples. The transmitter processor includes a digital-to-analog converter for converting the outputted L–A samples to an analog signal for transmission over a channel.

A receiver modem, coupled to the channel, includes an interpolator for receiving the L–A samples at a sampling rate $f_s r$. The interpolator resamples the L–A samples at a sampling rate $f_{st}$ to generate L–B samples, where B≧0 and $f_{st}$ is the sampling rate at which the samples are generated by the transmitter processor. A receiver buffer accumulates the L–B samples each time the L–B samples are generated by the interpolator, and outputs L samples when a total of at least L samples have accumulated in the receiver buffer.

BRIEF DESCRIPTION OF THE DRAWINGS

The objects, features and advantages of the present invention will be apparent to one skilled in the art in light of the following detailed description in which:

FIG. 4 illustrates an example of the transmission of data according to the present invention.

FIGS. 5 and 6 illustrate examples of the receiving of data according to the present invention.

DETAILED DESCRIPTION OF THE INVENTION

The present invention provides a method and apparatus for managing modem buffers to increase modem processor efficiency. For purposes of explanation, specific details are set forth to provide a thorough understanding of the present invention. However, it will be understood by those skilled in the art, from reading this disclosure, that the invention may be practiced without these details. Moreover, well-known elements, devices, process steps and the like are not set forth in order to avoid obscuring the invention.

Figure 1:
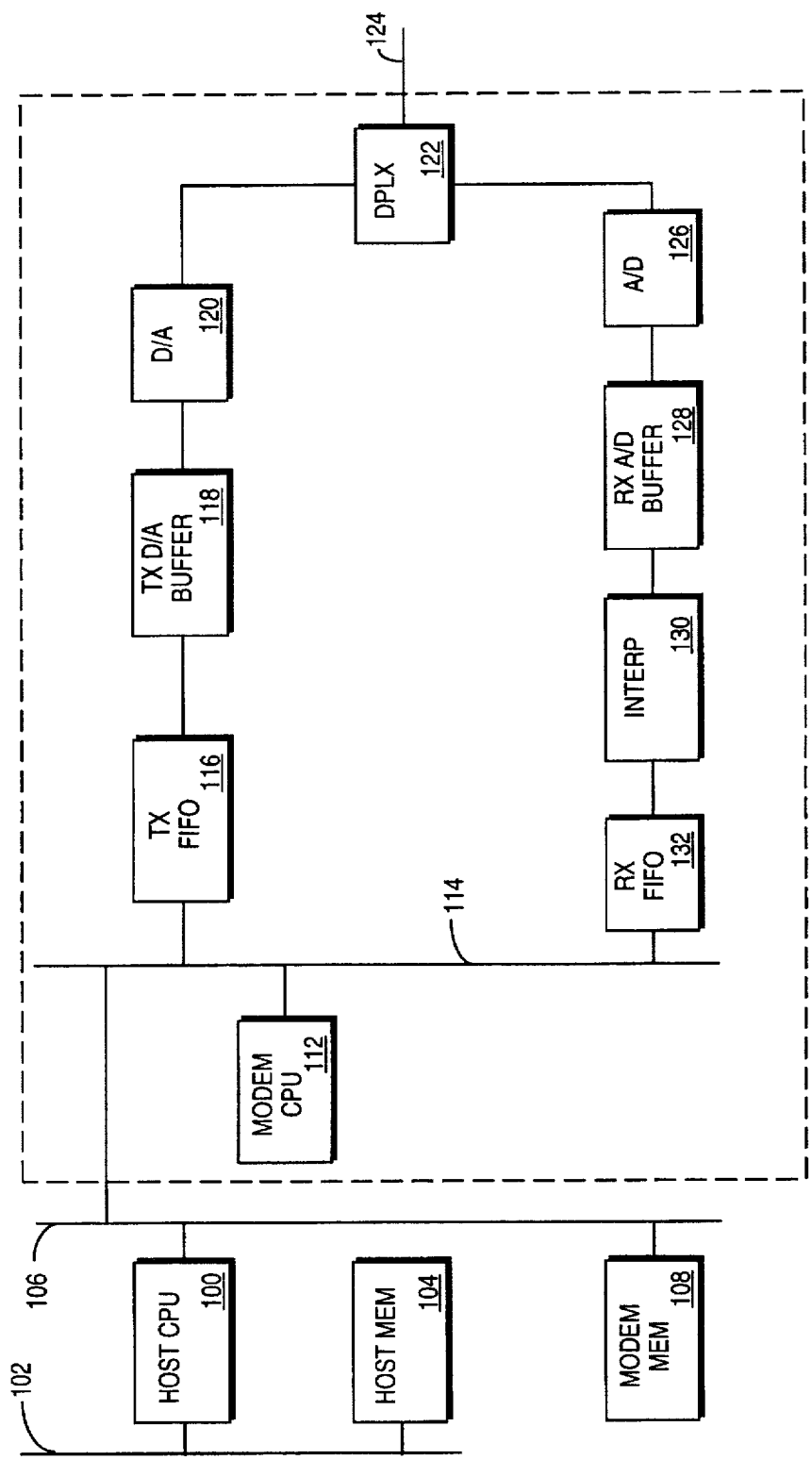
FIG. 1 illustrates a computer system incorporating the modem of the present invention.

FIG. 1 illustrates a computer system incorporating the modem of the present invention. The computer system includes a host processor 100 coupled to a host system bus 102. A host memory device 104, such as a DRAM, may be coupled to the host processor 100 through the bus 102. The host processor 102 is also coupled to an I/O bus 106. The I/O bus 106 may, for example, be an AT or EISA bus. A memory device 108 for use by the modem is also coupled to the I/O bus 106.

The modem is preferably implemented on a card 110 that plugs into the computer system. Those skilled in the art will recognize that the modem may alternatively be implemented as a discrete device or in a variety of other ways.

The intelligent modem includes a modem processor core 112 coupled to an internal modem bus 114. The processor core 112 prepares the symbols to be transmitted. A transmitter FIFO buffer 116 is coupled to the internal modem bus 114 to receive the symbols. The output of the transmitter FIFO buffer 116 is coupled to a transmitter digital-to-analog converter (D/A) buffer 118. The output of the transmitter D/A buffer 118 is coupled to a D/A 120. The analog output of the D/A 120 is input to a duplexer 122, which passes the resulting analog pulses on to a channel 124.

The duplexer 122 also passes analog pulses received over the channel 124 to an analog-to-digital converter (A/D) 126. Both the D/A 120 and the A/D 126 (within the same modem) are controlled by a modem clock (not shown) which provides the D/A 120 and the A/D 126 with a clock signal at a sampling rate fs. Digital samples from the A/D 126 are provided to a receiver A/D buffer 128, and then passed on to an interpolator 130. The resulting interpolated samples are stored in a receiver FIFO buffer 132. The samples from the receiver FIFO buffer 132 are passed on to the processor core 112 over the internal modem bus 114.

Figure 2:
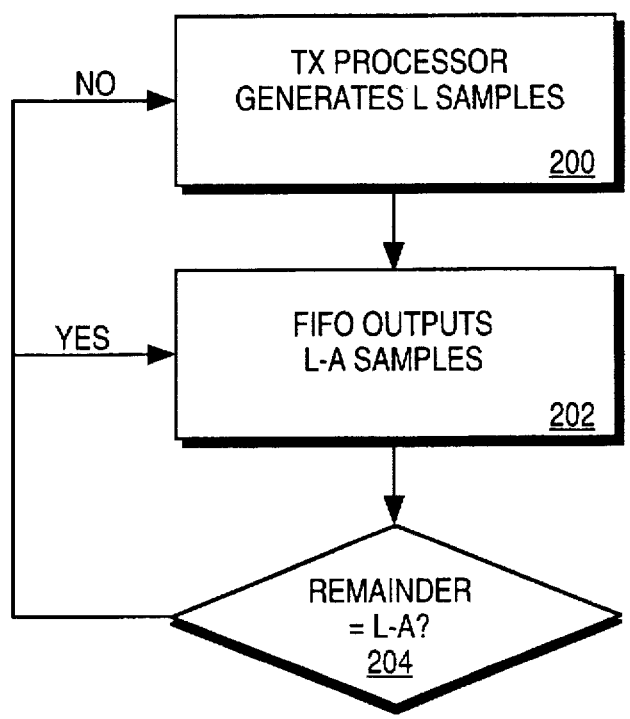
FIG. 2 is a flow chart diagramming the transmission of data according to the present invention.
Figure 3:
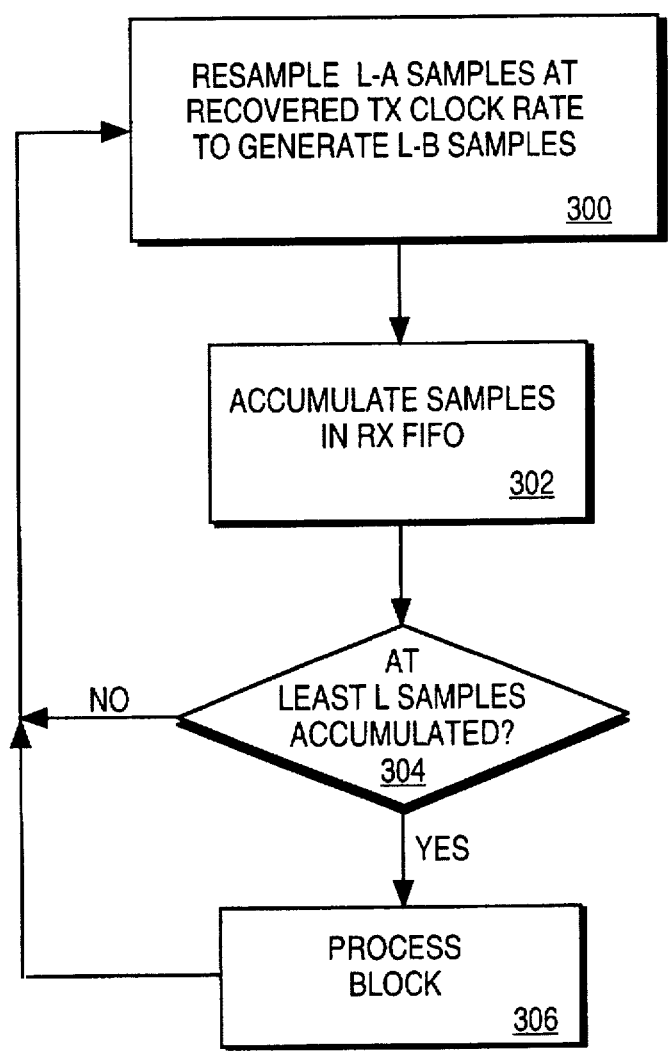
FIG. 3 is a flow chart diagramming the receiving of data according to the present invention.

FIGS. 2 and 3 are flow charts diagramming the operation of the present invention. Without loss of generality, the invention will be described in an example in which the transmitter and receiver modem processors process blocks of 120 samples at a time. At a typical sampling rate of three samples per symbol to satisfy the Nyquist criterion (at least two samples per symbol), 120 samples represent forty symbols.

The present invention avoids sharp increases in modem processor demand by transmitting blocks having fewer samples than can be processed by the receiver modem processor. Referring to FIG. 2, the transmitter processor core 112 generates a block of L, e.g., 120 samples (step 200). Rather than outputting the entire block, the transmitter FIFO buffer 116 outputs only L−A samples, where A≧1 (step 202). The value of A is constrained so that the transmitter processor core 112 has the capacity to generate L samples in L−A sample periods. A small value of A is preferred. The L−A samples are output to the transmitter D/A buffer 118, which transfers the samples to the D/A 120 for transmission over the channel 124 through he duplexer 122.

Because the transmitter FIFO buffer 116 does not transmit all L samples received from the processor core 112, the buffer 116 accumulates A samples each time it receives L samples but outputs only L−A samples. The transmitter processor core 112 keeps track of the value L−A and the number of blocks outputted by the FIFO buffer 116. Given this information, the transmitter processor core 112 determines whether the total number of accumulated samples remaining in the buffer equals L−A (step 204). If the samples accumulated in the FIFO buffer 116 have not reached that value, then the transmitter processor core 112 generates another block of L samples (step 200). If, on the other hand, L−A samples have accumulated, then the generation of a block by the processor core 112 is skipped, and, instead, the FIFO buffer 116 outputs the accumulated L−A samples (step 202). Thus, the transmitter processor core 112 will occasionally skip the processing of a block.

FIG. 3 is a flow chart diagramming the operation of a receiver modem according to the present invention. The receiver modem is referred to herein as the local modem, which receives data over the channel from the remote transmitter modem. Both the transmitter and receiver modems preferably include the same components shown in FIG. 1 for transmitting and receiving data. The receiver modem A/D 126 receives an analog waveform representing the transmitted samples over a channel 124. Although the A/D and the D/A within the same modem are clocked at the same sampling rate fs, the sampling rate $f_{sr}$ of samples outputted by the A/D 126 is typically slightly different from the sampling rate $f_{st}$ of the transmitter modem D/A 120. This difference tends to be very small, but in conventional modems would result in a sudden demand on the receiver processor to occasionally process extra symbols when $f_{sr} > f_{st}$ (the "remote overspeed" case). The present invention avoids this sudden demand on processor capacity, as described below.

The digitized samples are transferred to the receiver A/D buffer 128, which, in turn, transfers the samples to the interpolator 130. The interpolator 130 receives the samples at the sampling rate $f_{sr}$. A symbol timing recovery circuit (not shown) within the interpolator 130 recovers the transmitter modem sampling rate $f_{st}$ from the received symbols. Based upon this sampling rate, the interpolator 130 resamples the L−A samples at the recovered transmitter sampling rate to generate L−B samples, where B≧0 (step 300). The value of B may change from block to block.

The implementation of an interpolator is well known in the art. Conceptually, the interpolator may be thought of as a D/A followed by an A/D. The D/A receives samples at the rate $f_{sr}$ and converts the samples into an analog waveform. This analog waveform is resampled by the A/D at the rate $f_{sr}$. If $f_{st} = f_{sr}$, then L−A=L−B. In the remote underspeed case ($f_{st} < f_{sr}$), occasionally B>A. Thus, the interpolator 130 outputs fewer samples than are input. In the remote overspeed case ($f_{st} > f_{sr}$), then occasionally B<A. Thus, the interpolator 130 will output more samples than input. The transmitter modem and the receiver modem are designed to have sampling rates such that the maximum difference between those rates is within a given tolerance. The value of A is chosen so that B≧0. Because B≧0, the maximum value of L−B=L. The larger the tolerance, the larger the value of A that should be chosen through experimentation to ensure that the receiver processor can process all received samples in the remote overspeed case.

The samples outputted by the interpolator 130 are transferred to the receiver FIFO buffer 132. Because the number of received samples L−B may be less than the number L of samples required by the receiver processor core 112 to process a block, the receiver FIFO buffer 132 must accumulate blocks of L−B samples (step 302). When the receiver FIFO 132 has accumulated at least L samples (step 304), it outputs those samples to the receiver processor core 112 for processing (step 306).

The number of samples remaining in the receiver FIFO buffer 132 after the L samples have been outputted will occasionally decrease to zero except in cases of extreme remote overspeed. When no samples remain, then the next time the FIFO 132 receives L−B samples from the interpolator 130, the FIFO 132 will be unable to provide L samples to the receiver processor core 112 because L samples will not have been accumulated. Thus, the receiver processor core 112 will skip the processing of the recovered samples in step 306. Rather, the receiver modem will continue to receive samples in the interpolator 130 (step 300). Consequently, an advantage of the present invention is that, rather than occasionally overburdening the receiver processor, the buffer management technique of the present invention causes the receiver processor to occasionally skip processing. More generally, because the number of samples L−B that are outputted by the interpolator 130 can never exceed the processing capacity L of the receiver processor core 112, the receiver processor core 112 will never experience a sudden demand on processor capacity to process two blocks at a time. The receiver FIFO buffer 132 can never accumulate 2*L or two blocks of samples. Rather, even in the remote overspeed case, the receiver processor core 112 will only be required to process L samples at a time.

Examples of the operation of the present invention will now be described with respect to FIGS. 4, 5 and 6. These examples assume that the block size L=120 samples, equivalent to 40 symbols sampled at a rate of three samples per symbol. The value of A=1, so that 119 samples are actually communicated over the channel 124. A V.34 modem implementation is assumed. According to the V.34 specifications, the maximum difference between the symbol clock rates of the local (receiver) and remote (transmitter) modems is +/-200 ppm (parts per million). Therefore each modem must be designed to compensate for a clock difference of at least 400 ppm.

FIG. 4 illustrates the operation of the transmitter modem of the present invention. During a first transmitter block period, the transmitter processor core 112 generates a first block of 120 samples, which are stored in the transmitter FIFO 116. The FIFO 116 outputs 119 samples to the D/A buffer 118, leaving one sample in the FIFO 116. The transmitter block period may be defined as the duration in which the transmitter processor core generates a block of L samples and the transmitter FIFO outputs L–A samples.

During a second block period, the transmitter processor then generates a second block of 120 samples and stores them in the FIFO 116. The 120 samples, when added to the one sample already stored in the FIFO 116, results in 121 samples stored in the FIFO 116. Of this number, 119 samples are transferred to the D/A buffer 118, leaving two samples in the FIFO 116. As more blocks are generated by the transmitter processor, extra samples accumulate in the FIFO. When the transmitter generates the 119th block, a total of 238 samples are stored in the FIFO 116. Of these 238 samples, 119 are transferred to the D/A buffer 118, leaving 119 samples in the FIFO 116. Because 119 samples are available from the FIFO, there is no need for the transmitter to generate another block of samples. Therefore, the transmitter skips processing of the next block during the 120th block period. During this period, the 119 samples remaining in the FIFO are transferred to the D/A buffer 118, leaving no samples in the FIFO 116. The transmitter processor then resumes the generation of a block of 120 samples, and modem buffer operation continues as before.

FIG. 5 illustrates the operation of the receiver modem of the present invention in the remote overspeed case, and FIG. 6 illustrates the operation of the receiver modem of the present invention in the remote underspeed case. The receiver modem will always receive L–A (e.g., 119) samples over the channel 124. In the remote overspeed case, the interpolator will occasionally, or, in the case of extreme remote overspeed, always, generate L–B=120 samples, rather than L–B=119 samples. As shown in FIG. 5 in this example, the interpolator initially outputs 119 samples and transfers them to the receiver FIFO 132. When at least L=120 samples have accumulated, the FIFO 132 outputs 120 samples for processing by the receiver processor core 112. A receiver block period may be defined as the duration in which the receiver FIFO outputs L samples and the receiver processor processes them.

Because only 119 samples are being fed into the FIFO 132 while 120 samples are being removed from the FIFO 132, the number of samples remaining in the FIFO 132 tends to decrease. In the overspeed case, however, as shown during block period 5, the interpolator occasionally outputs L=120 samples. This will stop the decrease in the FIFO 132 remainder during those periods when L=120 samples are recovered by the interpolator 130. However, the FIFO remainder will never increase. At some point, as long as $f_{st} < f_{sr}$, the remainder will decrease to zero. If the interpolator then outputs 119 samples for the next block, then a full block of 120 samples will not be available to the receiver processor from the FIFO 132. Thus, the receiver processor will skip processing.

In the remote underspeed case, the number of samples recovered by the interpolator 130 will occasionally fall below L–B=119 samples as shown for block period 5 (where L–B=118) in FIG. 6. When this happens, the FIFO remainder will decrease accordingly. This will lead to the remainder approaching zero at a more rapid rate than in the normal speed or overspeed cases.

Based on the foregoing, those skilled in the art will recognize that the receiver modem processor according to the present invention will never be subjected to an unacceptable increase in processor demand.

It will be appreciated that various modifications and alterations might be made by those skilled in the art without departing from the spirit and scope of the present invention. The invention should, therefore, be measured in terms of the claims which follow.

What is claimed is:

1. In a method for controlling the processing load on a digital processor in a receiving modem that receives analog data over a channel from a transmitting modem where said analog data was generated using a clock in said transmitting modem running at a first frequency and wherein said receiving modem includes an analog to digital converter for converting said received analog data into digital samples of said analog data using a receiving modem clock running at a second frequency, an interpolator for recovering said first frequency and for resampling said digital samples at said first frequency, a FIFO memory for temporarily storing said samples and wherein said digital processor has a desired processing capacity reserved for processing L samples of digital data per block processing period, the method comprising the following steps:

(a) receiving said analog data;

(b) generating successive first blocks of digital samples from said analog data using said second frequency wherein each of said successive first blocks has fewer than L samples;

(c) recovering said first frequency from said first block of digital samples;

(d) resampling each of said successive first block of digital samples at said first frequency to create successive second blocks of digital samples;

(e) storing each of said second blocks of digital samples in said FIFO on a first-in, first-out basis;

(f) testing said FIFO to determine if said FIFO contains at least L samples;

(g) if said FIFO contains at least L samples, transferring a block of L samples from said FIFO to said digital processor and repeating steps (a) through (h);

(h) if said FIFO contains fewer than L samples, passing zero samples from said FIFO to said digital processor and repeating steps (a) through (h).

2. The method of claim 1 wherein L=120.

3. The method of claim 1 wherein A=1.

4. A method for communicating data comprising the steps of:

(a) receiving L–A samples of a block of data at a sampling rate $f_{sr}$, wherein $A \geq 1$;

(b) resampling the L–A samples at a sampling rate $f_{st}$ to generate L–B samples, wherein $B \geq 0$ and $f_{st}$ is the sampling rate at which the samples are generated by a remote transmitter;

(c) accumulating the L–B samples in a receiver buffer;

(d) if a total of at least L samples have accumulated in the receiver buffer, outputting L samples from the receiver buffer; and (e) if the L–A samples received in step (a) are not part of a last block, repeating steps (a)–(e).

5. The method of claim 4, wherein A=1.

6. The method of claim 4, wherein L=120.

* * * * *